May 7, 1957     T. L. BONKOWSKI     2,791,299
DEMOUNTABLE BRAKE LINING
Filed Oct. 8, 1954
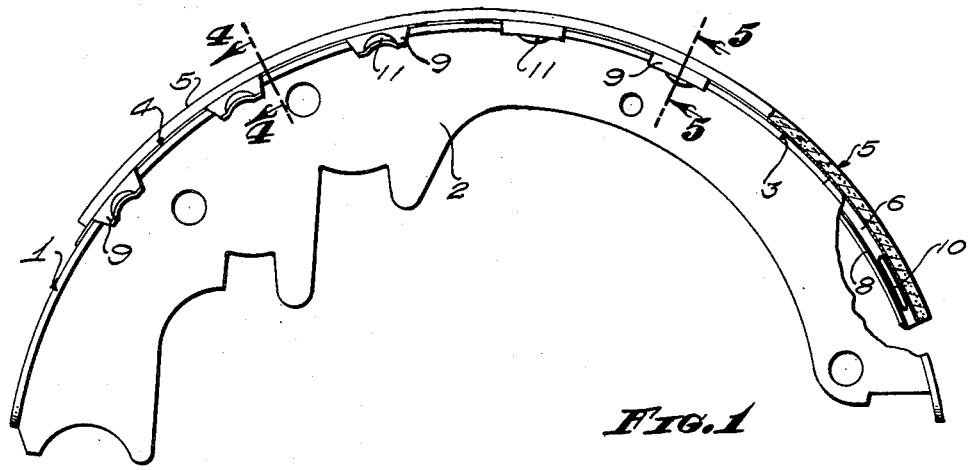
INVENTOR.
TEOFIL L. BONKOWSKI
BY
Lyon & Lyon
ATTORNEYS

United States Patent Office 2,791,299
Patented May 7, 1957

2,791,299

DEMOUNTABLE BRAKE LINING

Teofil L. Bonkowski, Los Angeles, Calif.

Application October 8, 1954, Serial No. 461,218

12 Claims. (Cl. 188—234)

My invention relates to demountable brake linings, and included in the objects of my invention are:

First, to provide a demountable brake lining so arranged that the brake lining may be removed and replaced without removing the brake shoe from the vehicle wheel.

Second, to provide a demountable brake lining having a continuous flange along one margin, in which means are provided for interlocking with the brake shoe to prevent circumferential displacement of the brake lining.

Third, to provide a demountable brake lining wherein foldable tabs secure the brake lining to the brake shoe, by folding under the margin of the shoe, and are provided with means to facilitate straightening of the tabs when it is desired to replace a worn brake lining.

Fourth, to provide a demountable brake lining which is particularly arranged to facilitate initial installation on a brake shoe prior to assembly, in the course of manufacture of the vehicle to which it is attached, while permitting ready later replacement when the brake linings have worn out.

With the above and other objects in view, as may appear hereinafter, reference is directed to the accompanying drawings, in which:

Figure 1 is a side view of a brake shoe incorporating my demountable brake lining;

Fig. 2 is a developed view of the brake shoe;

Fig. 3 is a developed view of the blank from which the brake lining mounting plate is formed;

Fig. 4 is an enlarged transverse sectional view, through 4—4 of Fig. 1;

Fig. 5 is a transverse sectional view through 5—5 of Fig. 1;

Fig. 6 is a fragmentary sectional view of the backing plate, taken through 6—6 of Fig. 5, the backing plate being shown flat instead of arcuate to facilitate the illustration;

Fig. 7 is a fragmentary view similar to Fig. 6, showing a modified form of the backing plate; and Fig. 8 is another fragmentary sectional view similar to Fig. 6, showing a further modified form of the backing plate.

My demountable brake lining is adapted to be mounted on a brake shoe 1. The brake shoe is a rigid arcuate member reinforced by a central rib 2. The brake shoe is a conventional vehicle brake shoe except that the side margins are provided with a series of shallow notches or recesses 3.

My demountable brake lining includes a mounting plate 4 formed of relatively thin sheet metal and bent into arcuate form. Bonded by cement, or otherwise secured, to the mounting plate is a brake lining element 5.

The mounting plate 4 is reinforced along one margin by a channel flange 6 which lends stiffness to the mounting plate so that the mounting plate and lining element 5 are held in proper arc to conform to the curvature of the brake shoe 1.

The channel flange 6 includes a radially inwardly directed portion 7 which fits over the side margin of the brake shoe, and a radially axially directed portion 8 which hooks under the margin of the brake shoe. The opposite margin of the mounting plate is provided with a series of spaced tabs 9 which are adapted to be folded around and under the corresponding margin of the brake shoe. The channel flange 6 and tabs 9 therefore clamp the opposite sides of the brake shoe and secure the demountable lining unit thereon.

In order to securely lock the demountable brake lining unit against axial displacement relative to the brake shoe, the radial portion 7 of the channel flange 6 is provided with a series of axially directed ribs 10 of such dimensions as to fit into the side notch 3 along the corresponding margin of the brake shoe. In addition, the tabs 9 are so located as to enter the notches 3 at the opposite side of the brake shoe. The tabs 9 and ribs 10 thus securely lock the demountable brake lining unit against circumferential displacement.

My demountable brake lining unit is installed as follows:

Assuming that the brake shoe is in place on a vehicle wheel, one margin faces the back of the brake drum and the other margin faces outwardly. The demountable brake lining unit is set over the brake shoe and moved axially inward so that the channel flange 6 may drop behind the corresponding margin of the brake shoe. The demountable lining unit is then drawn forwardly, causing the axial lip 8 of the channel flange 6 to hook under the margin of the brake shoe and the ribs 10 to enter the corresponding side notch 3. The tabs 9 are then bent around the outer margin of the brake shoe into the corresponding side notch and then folded under the brake shoe, as shown best in Fig. 5.

It is desirable to arrange the tabs 9 so that initially they are in slight angular relation with the mounting plate 4, as shown best in Fig. 4. This not only aids in proper folding of the tabs, but also is particularly useful in the initial installation of a demountable brake lining unit on a brake shoe prior to assembly of the brake shoe in the brake. By reason of the angular position of the tabs 9, it is a simple matter to arrange a jig or press so that all of the tabs may be folded simultaneously; thus expediting the manufacture.

However, when the demountable brake lining unit is employed as replacement for a worn brake lining unit and the operation is performed on the vehicle without removal of the brake shoe, it is usually more convenient to fold the tabs 9 individually by means of an appropriate tool. In order to facilitate removal of a worn demountable brake lining unit, the tabs 9 may be provided at their extremities with catch elements 11 which space the extremities from the under side of the brake shoe and facilitates the insertion of a prying tool.

While it is preferred to employ ribs 10, as shown in Figs. 1 through 6, for engagement with the side notches 3, pairs of projections 12 may be employed, as shown in Fig. 7, the projections being located adjacent opposite extremities of the notches 3.

As a further alternative, the radial portion 7 of the channel flange 6 may be provided with a series of slots 13, corresponding to the spacing between the notches 3, so as to form webs 14 which enter the notches.

Having fully described my invention, it is to be understood that I do not wish to be limited to the details herein set forth, but my invention is of the full scope of the appended claims.

I claim:

1. A brake structure, comprising an arcuate brake shoe having a series of circumferentially spaced notches along opposite margins thereof; a demountable brake lining including a mounting plate curved in conformity to said brake shoe; a brake lining element secured on said mounting plate; said mounting plate having a continuous channel along one arcuate margin of said brake shoe and foldable tabs spaced along the opposite arcuate margin of said mounting plate; and means formed in said channel for interlocking with the notches at the corresponding margin of said brake shoe; said foldable tabs adapted to enter the notches at the other margin or said brake shoe, whereby said means and said tabs secure said mounting plate against circumferential displacement relative to said brake shoe.

2. A brake structure as set forth in claim 1, wherein said interlocking means is a series of ribs offset from said channel to enter the notches of said brake shoe.

3. A brake structure as set forth in claim 1, wherein: said interlocking means is a series of projections disposed in pairs and extending from said channel into the notches of said brake shoe.

4. A brake structure as set forth in claim 1, wherein: said interlocking means is a series of webs formed by slotting said channel to receive the margin of said brake shoe between said notches.

5. A brake structure, comprising an arcuate brake shoe having a series of circumferentially spaced notches along opposite margins thereof; a demountable brake lining including a mounting plate curved to conform to said brake shoe, said mounting plate having a continuous channel extending along one arcuate margin to hook over one arcuate margin of said brake shoe, and having means formed therein to interlock with the notches of the brake shoe against circumferential displacement, and spaced foldable tabs at the opposite margin of said mounting plate adapted to fold into the notches at the opposite margin of said brake shoe and under said margin to secure said mounting plate against circumferential displacement and to cooperate with said channel to secure said mounting plate to said brake shoe; means at the extremities of said tabs to facilitate unfolding of said tabs from said brake shoe; and a brake lining element secured to said backing plate.

6. A brake structure as set forth in claim 5, wherein: said interlocking means is a series of ribs offset from said channel to enter the notches of said brake shoe.

7. A brake structure as set forth in claim 5, wherein: said interlocking means is a series of projections disposed in pairs and extending from said channel into the notches of said brake shoe.

8. A brake structure as set forth in claim 5, wherein: said interlocking means is a series of webs formed by slotting said channel to receive the margin of said brake shoe between said notches.

9. A brake structure, comprising: an arcuate brake shoe having a series of circumferentially spaced notches along a margin thereof; a demountable brake lining including a mounting plate curved to conform to said brake shoe, said mounting plate having a continuous channel extending along said notched margin, and having means formed therein to interlock with the notches of said brake shoe against circumferential displacement, and spaced foldable tabs at the opposite margin of said mounting plate adapted to fold over the opposite margin of said brake shoe; and a brake lining element secured to said backing plate.

10. A brake structure as set forth in claim 9, wherein: said interlocking means is a series of ribs offset from said channel to enter the notches of said brake shoe.

11. A brake structure as set forth in claim 9, wherein: said interlocking means is a series of projections disposed in pairs and extending from said channel into the notches of said brake shoe.

12. A brake structure as set forth in claim 9, wherein: said interlocking means is a series of webs formed by slotting said channel to receive the margin of said brake shoe between said notches.

References Cited in the file of this patent

UNITED STATES PATENTS

| 1,537,234 | Hartman et al. | May 12, 1925 |
| 1,950,260 | Nelson | Mar. 6, 1934 |
| 2,590,749 | Buccino et al. | Mar. 25, 1952 |
| 2,631,697 | Bonkowski | Mar. 17, 1953 |

FOREIGN PATENTS

| 608,876 | France | Apr. 30, 1926 |